Aug. 17, 1965   O. KRAIC ETAL   3,200,796
ROTARY PISTON INTERNAL COMBUSTION ENGINE
Filed June 1, 1962   7 Sheets-Sheet 1

Fig. 1.

INVENTORS
Otto Kraic, Václav Stoupa
BY
Richard Emb
Agt

Fig. 2.

Aug. 17, 1965         O. KRAIC ETAL         3,200,796
              ROTARY PISTON INTERNAL COMBUSTION ENGINE
Filed June 1, 1962                         7 Sheets-Sheet 3

*Fig. 3.*

INVENTORS
Otto Kraic, Václav Stoupa
BY

Aug. 17, 1965  O. KRAIC ETAL  3,200,796
ROTARY PISTON INTERNAL COMBUSTION ENGINE
Filed June 1, 1962  7 Sheets-Sheet 6

Fig. 6.

INVENTORS
Otto Kraic, Václav Stoupa
BY
Richard ⎯⎯ Agt 3,200,796
ROTARY PISTON INTERNAL COMBUSTION
ENGINE
Otto Kraic and Václav Stoupa, Prague, Czechoslovakia, assignors to Ústav pro výzkum motorových vozidel Praha, Prague, Czechoslovakia
Filed June 1, 1962, Ser. No. 199,475
Claims priority, application Czechoslovakia, June 3, 1961, 3,455/61
11 Claims. (Cl. 123—16)

This invention relates to an internal combustion engine having a rotary piston arranged eccentrically to move within a casing of circular cross section and vanes inserted in the piston and maintaining sliding contact with the casing.

It is a primary object of the invention to achieve the largest possible number of power strokes in each revolution of the eccentric piston and thus to raise the engine output without increasing the sliding speed of the highly stressed plate seals on the casing wall. It is another object of the invention to achieve as even a torque as possible, and thereby a more favorable stressing of the individual engine parts and a lower stress in the transmission coupled to the engine output shaft.

It is a more specific object of this invention to double the output of an engine of the type described as compared to known engines of similar size without increasing the sliding speeds of the seals relative to the casing which is essential to engine life. This is achieved by increasing the number of ignitions per revolution, so that the torque becomes much more even.

An essential feature of the invention is an eccentric which is arranged in the engine casing on the output shaft. The eccentric rotatably supports the piston. The eccentric and the piston are connected in such a manner that they simultaneously rotate in opposite directions relative to the casing, the latter being provided with intake and exhaust valve means where the individual combustion chambers defined between the casing, the vanes, and the piston attain their minimum volume. The combined number of the valve means and of the ignition means for initiating combustion in each chamber is equal to the number of vanes or chambers plus one. The relative movement of the piston and of the eccentric is preferably actuated by means of internal ring gear which is fixed on the casing, and a spur gear fastened to the piston. The ratio of the number of teeth on the two gears is equal to the ratio between the aforementioned combined number and the number of the vanes or chambers. The operating cycle of each valve means is identical in length with one revolution of the eccentric.

The engine according to the invention may achieve up to twice the engine output and up to twice the number per unit time of ignitions as compared with a known engine of equal size while the sliding speeds of the seals in relation to the casing remain unchanged and, consequently, an equal engine life is ensured. Moreover, in the engine according to the invention, the combustion cycle takes less time, and heat losses are accordingly lower. This is of particular importance since engines of the rotary piston type are characterized by an unfavorable ratio of chamber surface to capacity.

The more uniform torque permits a reduction in the size of individual engine parts and a resulting further increase of engine output because of a large volumetric capacity for a given engine size. The engine design according to the invention is particularly advantageous for engines having large combustion spaces. The low rotary speed necessary in such engines to attain a practical sliding speed of the seals can be compensated for, to a considerable extent, by a higher number of ignitions per revolution of the eccentric.

It is of advantage to select the combined number of valve means and ignition means according to the number of vanes. In light engines maximum output is obtained in an engine of greatest simplicity. In heavy engines, low pressures on the piston and on even torque can be obtained thereby.

In an engine according to the invention, the piston and vanes and the eccentric may be coupled for joint movement in a simple manner by an internal ring gear and a spur gear. The preferred ratio of the tooth numbers permits a heavy eccentric shaft to be used so as to reduce the stresses in the gear teeth.

When the operating cycle of the valve means is equal in length to a revolution of the eccentric, the drive of the valve means need not include a reduction gear. Because of the particular location of the valve means, sealing can be dispensed with.

It is advantageous, in some cases, to increase the cycle time of the valve means in order to reduce peripheral speeds. This applies particularly to high speed engines.

Maximum economy of operation is achieved in a six-stroke cycle version of the engine of the invention which has two valve means disposed one after the other without an ignition means being inserted therebetween.

A rotary valve having exhaust and suction chambers recessed in the surface of the rotary valve body is subject to little heat stress. The combustion products traversing the valve means contact only small surfaces in the chambers and are rapidly conducted into casing channels which can be well cooled.

It is a common feature of all valve means of the invention that sealing can be dispensed with without affecting engine operation or output, as compared with known similar four-stroke engines, wherein the valves must have perfect seals.

Preferred embodiments of the invention are shown, by way of example, in the accompanying drawings, wherein.

Figure 1:
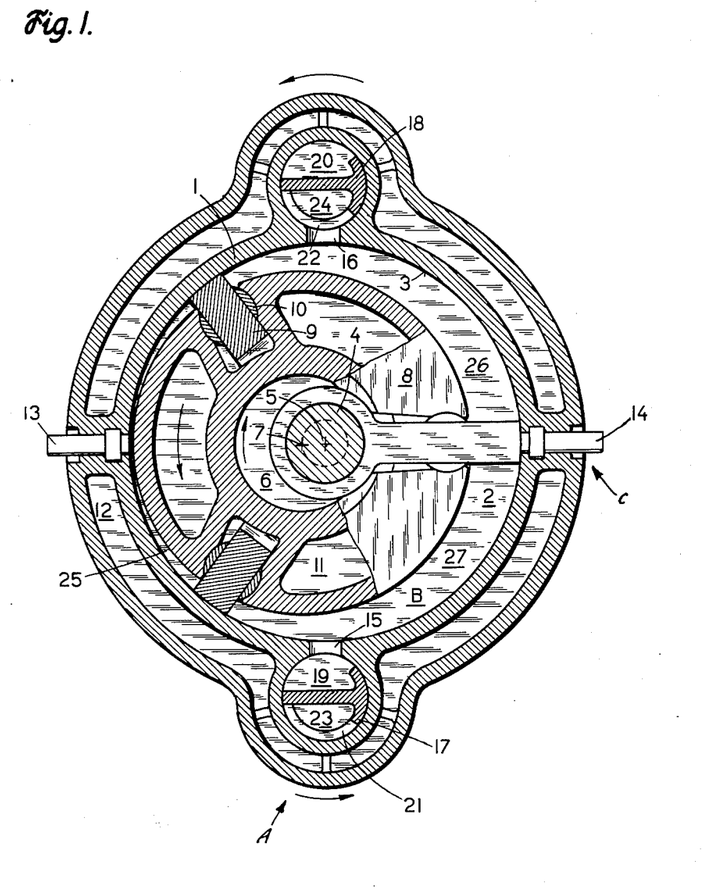
FIG. 1 is a radially sectional view of a three-vane engine of the invention.

Referring now to the drawing in detail, and initially to FIG. 1, there is seen a cylindrical casing 1 have radial end walls 2. The cylindrical inner casing wall 3 surrounds a shaft 4 adapted to rotate about the common axis. An eccentric 6 is fixedly attached to the shaft 4 and has a cylindrical face about an axis 7. A piston 8 of cylindrical shape is adapted to rotate on the eccentric face about the axis 7. A gear transmission, not visible in FIG. 1 connects the shaft 4 with the piston 8 in such a manner that the piston revolves three times during each revolution of the shaft.

The piston 8 has three radial slots spaced 120° apart which engage respective vanes 9, rotatably mounted on the shaft 4. The vanes 9 are free to shift radially relative to the piston 8 and simultaneously to tilt slightly in the engaging slots. They are sealed to the piston 8 by packings 10 of circular cross section. The central cylindrical portion of the engine casing 1 and the end walls 2 are provided with a jacket 12 adapted to receive a cooling liquid. The piston 8 is similarly provided with cooling chambers 11.

The radial surfaces of the piston 8 are provided with non-illustrated seals which seal an annular space B in the casing cavity. The vanes 9 divide the annular space B into three combustion chambers 25, 26, 27. The axially central portion of the casing 1 is equipped with two diametrically opposite ignition means C, namely the spark plugs 13 and 14.

The combustion cycle is timed by valve systems A. Two rotary valves 17, 18 control fluid flow through apertures 15 and 16, respectively arranged in diametrically opposite portions of the wall 3 symmetrically between the plugs 13, 14 and have respective intake chambers 19, 20 and exhaust chambers 21, 22 communicating with exhaust ports 23 and 24, respectively. The intake chambers 19, 20 similarly communicate with intake ports which are not shown. The valves are driven to rotate in a counterclockwise direction, as indicated by arrows in FIG. 1.

The instantaneous volume of each combustion chamber is determined by the relative angular position of the piston 8 and of the shaft 4. The space 25 is illustrated in FIG. 1 in its position of minimum volume adjacent the casing wall portion carrying the ignition means 13. The chamber 26 is shown in communication with the exhaust port 24 and the chamber 27 is in the intake position.

The above-described engine operates as follows:

The ignited gas within the chamber 25 expands, while the eccentric shaft 4 rotate clockwise about the axis 5 and the piston 8 simultaneously rotates counter-clockwise about the axis 7, as viewed in FIG. 1. When the piston 8 has turned approximately 30°, the leading vane 9 of the chamber 25 passes the aperture 15, but expansion of the gases in the chamber continues, and the aperture is initially obstructed by the closed rotary valve 17. When the piston 8 has turned 45° from its initial position, the chamber 25 reaches its maximum volume, while the eccentric shaft turns 135°. Before the piston 8 reaches the maximum volume position, the valve 17 opens the aperture 15, and the combustion gases are exhausted through the exhaust chamber 21 and the exhaust port 23. Exhaust takes place while the volume of the chamber 25 decreases.

When the piston 8 has turned 90° from its initial position and the eccentric shaft 270°, the chamber 25 is reduced to its minimum volume. Beore this position is reached, a narrow edge of the rotary valve 17 extends across the aperture 15, so that the chamber 25 is also connected with the intake chamber 19. As movement of the piston 8 continues, the valve 17 disconnects the exhaust chamber 21 from the combustion chamber 25, and only intake occurs.

Maximum capacity of the chamber 25 is again attained after a total rotation of the piston 8 through 135°, corresponding to a rotation of the eccentric shaft 4 through 405°. When this position is passed, the valve 17 closes the aperture 15, and compression of the explosive mixture in the chamber 25 begins. At a position of the piston 8 offset from the illustrated position by 180°, and after rotation of the eccentric shaft 4 through 540°, the chamber 25 assumes its ignition position before the second ignition means 14.

The same sequence of events occurs within the chamber 25 during the second half revolution of the piston 8. Exchange of the spent working fluid for fresh mixture occurs at the rotary valve 18. Analogous combustion cycles take place in the chambers 26 and 27 at a phase shift. During each revolution of the piston 8, the plugs 13, 14 are fired six times, two explosions taking place within each of the chambers 25, 26 and 27, while the shaft 4 performs three revolutions. During each revolution of the eccentric 6 and the shaft 4, there occur two explosions.

The illustrated valve means 17 and 18 are positioned 90° after the firing means 13 and 14, in the direction of vane travel respectively. It is obvious, however, that the valve means 17 and 18 may be shifted towards the intake side, and that the expansion and compression pressure on the rotary valve 17 and 18 may be balanced thereby. Similiary, the firing means 13 and 14 may be shifted from their central position in the chamber at minimum volume.

Figure 2:
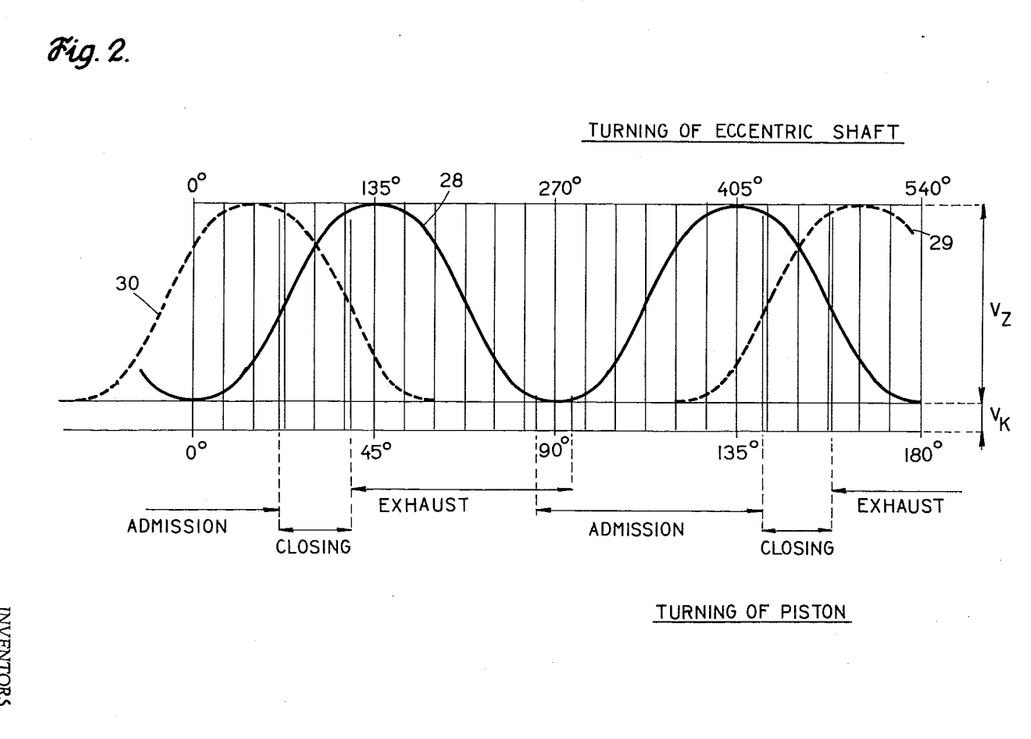
FIG. 2 shows a timing diagram for the three-vane engine of FIG. 1.

FIG. 2 diagrammatically shows the volume changes in the individual chambers of the space B, and the simultaneous events at one of the valve means A. The diagram of FIG. 2 relates to the engine shown in FIG. 1 which has three combustion chambers, and in which the eccentric shaft rotates in a direction opposite to that of the piston relative to the casing.

The curve 28 represents the volume changes of the chamber 25 in FIG. 1, the curve 30 relates to the chamber 27, and the curve 29 to the chamber 26. $V_k$ is the minimum volume of each combustion chamber, and $V_z$ the swept volume. The positions of the piston 8, and of the shaft 4 shown in FIG. 1 correspond to the volume of chamber 25 indicated on curve 28 at 0°. The value functions indicated apply to the valve 17. The same sequence of functions at a phase shift applies to the rotary valve 18.

Figure 3:
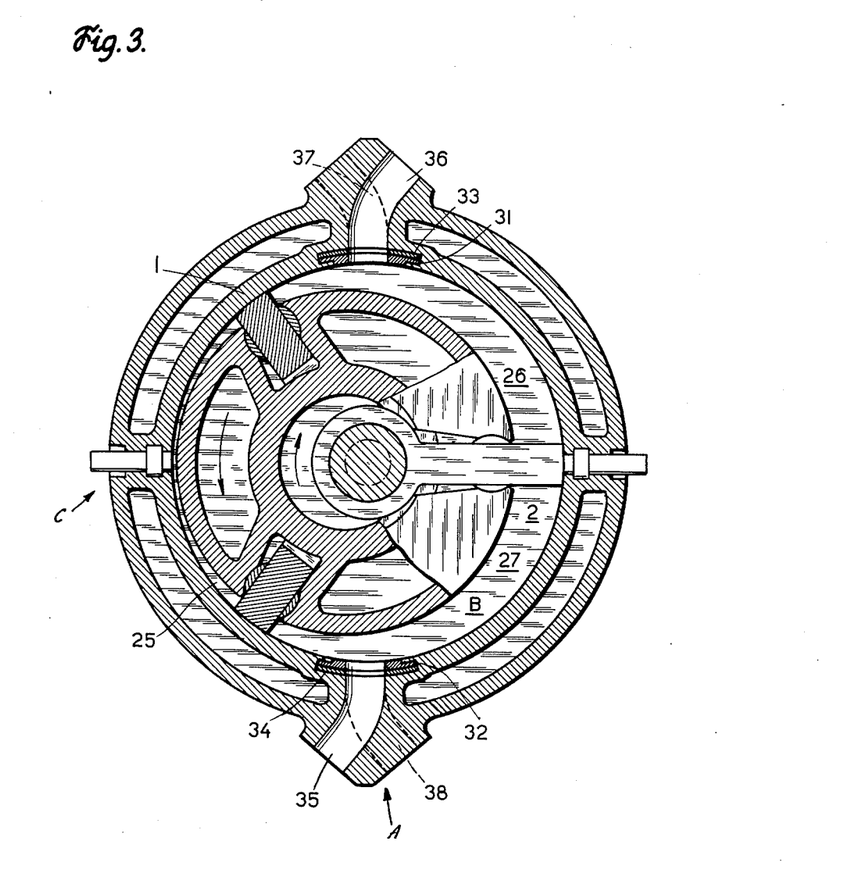
FIG. 3 shows a modification of the engine of FIG. 1.

FIG. 3 shows another three-vane engine according to the invention in which the engine casing 1 is provided with sliding valve plates 31, 32, 33 and 34 which control admission and discharge of fluid to and from the individual chambers 25, 26 and 27. The chambers are cyclically connected with the intake ports 35 and 37, and exhaust ports 36 and 38.

In the position shown, the chamber 25 is at its minimum volume while a fuel mixture is burned. The chamber 27 is in its intake position to draw fresh fuel mixture through the intake port 35, while the exhaust port 38 is closed by sliding valve plates 32 and 34. The chamber 26 begins exhausting into the exhaust port 36, the intake port 37 being closed by valve plates 31 and 33.

The working cycle of this engine is identical with that of the engine shown in FIG. 1.

Figure 4:
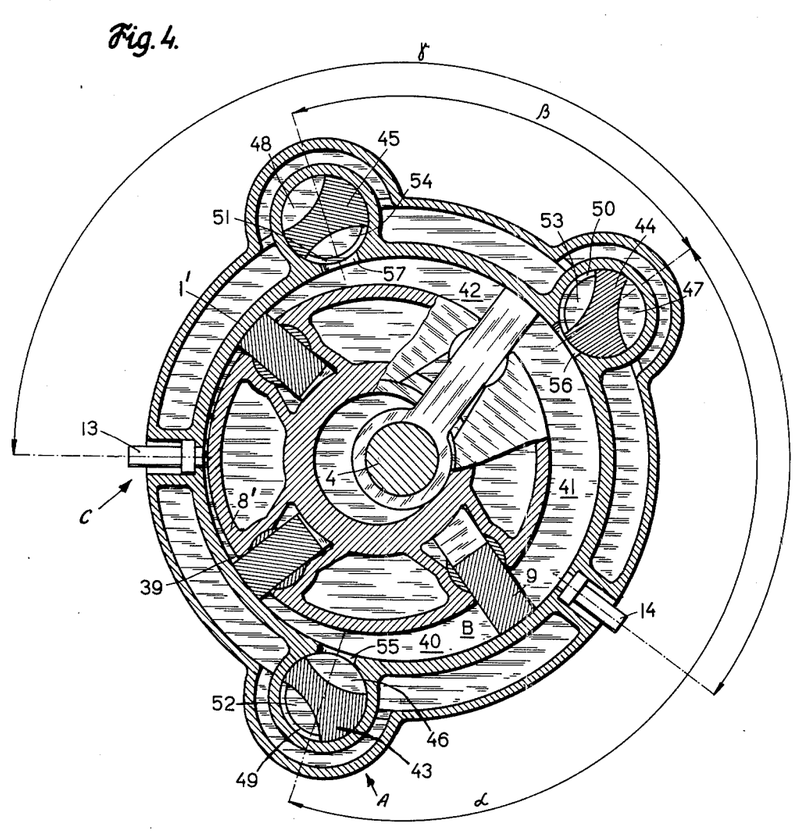
FIG. 4 shows a four-vane engine of the invention in radial section.

FIG. 4 shows an engine according to the invention which has four vanes 9 and four combustion chambers 39, 40, 41 and 42. The engine is shown in radial section. The illustrated engine permits a four- and six-stroke cycle to be performed in each combustion chamber during one revolution of the piston 8' relative to the casing 1'. The piston 8' is coupled with the eccentric 6 and shaft 4 for four revolutions of the eccentric and shaft during each revolution of the piston 8' in the opposite direction. The basic features of the engine illustrated in FIG. 4 are identical with those shown in FIG. 1.

The casing 1' carries three rotary valves 43, 44, 45 and two ignition plugs 13, 14. The valves and plugs are disposed at those portions of the casing 1' at which the combustion chambers 39, 40, 41 and 42 assume their minimum volumes. The valve 43 has the functions of exhausting burnt gases through an aperture 55 in the casing 1', an exhaust chamber 49 in the valve and an exhaust port 52, and of admitting fresh fuel mixture through an intake chamber 46. The rotary valve 44 exhausts burnt gases from an aperture 56 through an exhaust chamber 50 and a port 55, and draws scavenging air through an intake chamber 47. The rotary valve 45 exhausts the scavenging air through an aperture 57, a chamber 51, and a port 54. It draws fresh fuel mixture through the intake chamber 48.

The chamber 39 is shown in its minimum volume position when burning begins. The chamber 40 is in position for taking in fresh fuel mixture. The chamber 41 is at the end of its expansion stroke and begins exhausting. The chamber 42 is in position for exhausting scavenging air.

The valve means A and the ignition means C are arranged on the casing wall 3 where the combustion chambers attain their minimum volume. The angular spacing α of the valves 43, 44 is 144° which is equal to 720 degrees divided by the number of vanes 9 plus one. The two valves 44, 45 which are jointly interposed between the two ignition means 13, 14, are spaced from each other an angle β of 72°, or 360 degrees divided by the number of vanes 9 plus one. The angular spacing γ of the two spark plugs 13, 14 is 216° or 1080° divided by the number of vanes plus one.

It will be appreciated that the spacing of the valves A in the embodiment of the invention shown in FIGS. 1 and 3 is 180°, or 720° divided by the number of vanes plus one. The ignition means C are spaced in the same manner.

The operation of the engine shown in FIG. 5 will now be described with reference to chamber 39, shown in the position of minimum volume at incipient fuel combustion. During clockwise rotation of the shaft 4 and the counterclockwise rotation of the piston 8' together with the vanes 9, the volume of the chamber 39 increases, and expansion occurs. Maximum volume of the chamber 39 is reached after the piston 8' has rotated through 36°, and the shaft 4 through 144°. Before this position is reached, the leading vane 9 passes over the aperture 55, and the rotary valve 43 opens the exhaust chamber 49.

The chamber 39 reaches its next minimum volume after the piston 8' has rotated 72° from its initial position, and the shaft 4 through 288°. Before this position is reached, intake of fresh fuel mixture through the chamber 46 of the valve 43 begins, and exhaust into the valve chamber 49 is terminated. Intake ends after the chamber 39 is again expanded to its maximum volume when the piston 8' has rotated 108° and the shaft 432°.

When the piston 8' has rotated 144°, the chamber 39 reaches another ignition position. A position of maximum chamber volume follows after the piston 8' has rotated 180° and the shaft 720° and exhaust through the valve chamber 50 of the valve 44 begins. It terminates after the piston 8' has rotated 216°, and the eccentric shaft 864°.

Somewhat earlier, intake of scavenging air through the chamber 47 of the slide valve 44 begins, and is terminated when the piston 8' has rotated 252°, and the eccentric shaft 1008°. Before the chamber 47 of the valve 44 is closed, the valve 45 opens its chamber 54 and the scavenging air is exhausted. Exhaust is complete when the chamber 39 passes a position of minimum volume after the piston 8' has rotated 288° and the eccentric shaft 1152°.

Before the piston 8' reaches this position, intake of fresh fuel mixture through the chamber 48 of the valve 45 begins. When the piston 8' has rotated 324°, and after the chamber 48 of the valve 45 has been closed, compression takes place. When the piston 8' has rotated through 360° and the shaft 4 through 1440°, the chamber 39 is again in position for ignition of the fuel mixture at the spark plug 13.

An analogous sequence of events takes place in the other chambers 40, 41 and 42 at a phase shift.

Figure 5:
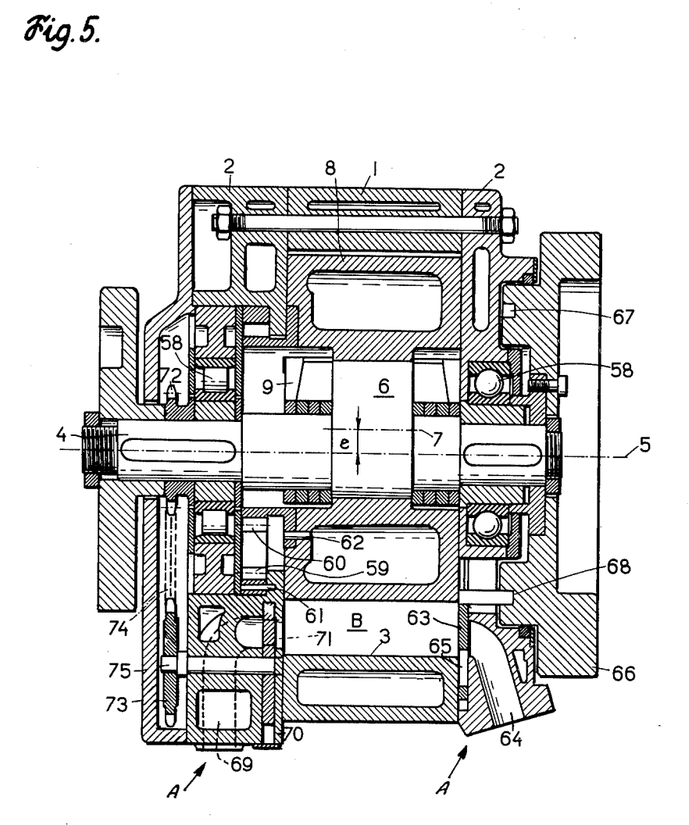
FIG. 5 is an axially sectional view of an engine closely similar to the engine illustrated in FIGS. 1, 3, 4, or 6.

FIG. 5 shows an engine according to the invention in axial section. The illustrated engine has four vanes 9 on the piston 8, but the illustrated structure is also representative of engines having a different number of vanes 9.

The casing 1 has two radial end walls 2 which axially bound the annular space B between the inner cylindrical wall 3 of the casing 1 and the outer surface of the piston 8. The space B is divided into chambers by four vanes 9 of which only the arms are shown. The arms are journaled on the shaft 4 which is supported in the end walls 2 of the casing 1 on bearings 58. The shaft 4 carries the fixedly attached eccentric 6 on which the piston 8 is rotatably mounted. The piston 8 rotates about the axis 7 of the eccentric 6. The shaft 4 rotates about the axis 5 which is also the geometrical axis of the cylindrical wall 3 of the casing 1.

The piston 8 and the vanes 9 are coupled by a gear transmission to the eccentric shaft 4 for joint rotation in opposite directions relative to the casing 1. The transmission consists of gear wheels 59 and 60. The internal ring gear 59 is fixedly attached to the casing wall 2 by a pin 61. The spur gear 60 continuously meshes with the wheel 59, and is fixedly attached to the piston 8 by means of a pin 62. The difference of the pitch circle diameters of the two wheels 59 and 60 is equal to twice the eccentricity e of the eccentric 6. The transmission ratio is selected in accordance with the number of vanes 9. The number of teeth on the ring gear 59 is related to the number of teeth on the spur gear 60 by a ratio of 5:4.

The single valve means A of the engine shown in FIG. 5 includes a slidable valve plate 63 which controls admission of fluid from an intake port 64 through an aperture 65 in the valve plate 63. Timed movement of the valve plate 63 is actuated by a flywheel 66 which is fixedly mounted on the shaft 4. An annular cam groove 67 in the flywheel 66 movably receives a cam follower pin 68 fixedly mounted on the valve plate 63. The valve means further cyclically opens and closes an exhaust port 69 by means of a rotary valve plate 70 mounted on the end wall 2. The plate 70 has an aperture 71 for communication between the annular space B and the exhaust port 69. Movement of the plate 70 is actuated by the shaft 4. Sprockets 72, 73 and a chain 74 connect the shaft 4 to a shaft 75 on which the plate 70 is mounted.

The engine shown in FIG. 5 and its valve means, only partly illustrated in the drawing, are operated in a manner substantially identical with that of the afore-described devices.

Figure 6:
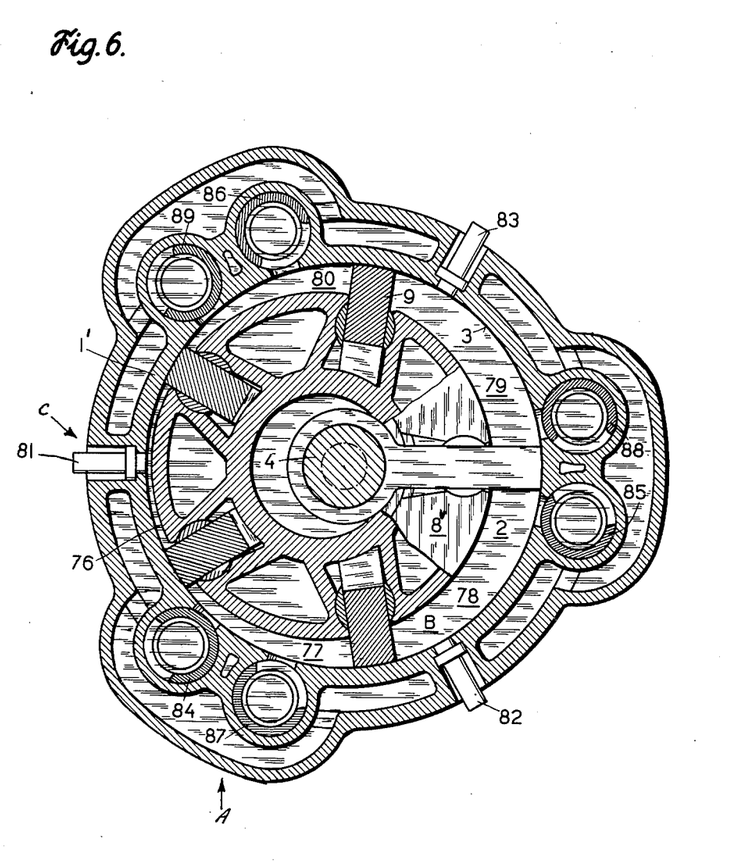
FIG. 6 shows a five-vane engine in a view corresponding to that of FIG. 1.

FIG. 6 shows a radial section of an engine having five vanes 9 which divide the space between the inner wall 3 of the casing 1", the casing end walls 2, and the piston 8", into five combustion chambers 76, 77, 78, 79, 80. To achieve a four-stroke cycle in the chambers 76, 77, 78, 79, 80, there are provided three spark plugs 81, 82, 83 circumferentially alternating with three valve systems A. The shaft 4 rotates at five times the speed of the piston 8" and in the opposite direction. The three valve systems include respective rotary exhaust valves 84, 85, 86 and respective intake valves 87, 88, 89. The exhaust valve and the intake valve of each valve system are closely juxtaposed.

The operation of the engine shown in FIG. 6 is closely analogous to that of the afore-described engines. Chamber positions of maximum and minimum volume follow one another when the piston 8" rotates 30°, and when the shaft 4 simultaneously rotates 150°. Three combustion cycles take place in each chamber 76, 77, 78, 79, 80 during one revolution of the piston 8" relative to the casing 1".

Figure 7:
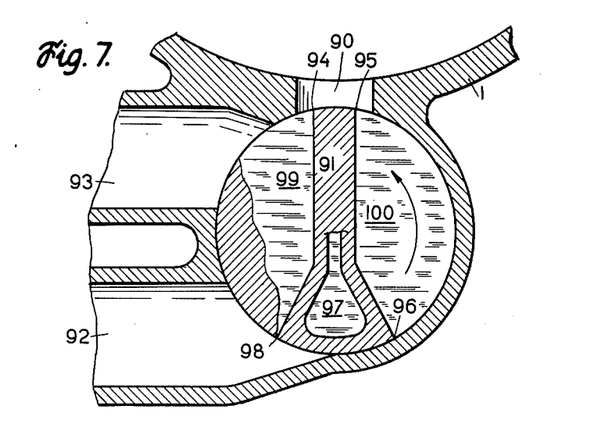
FIG. 7 is a radially sectional view of a valve for an engine of the invention.
Figure 8:
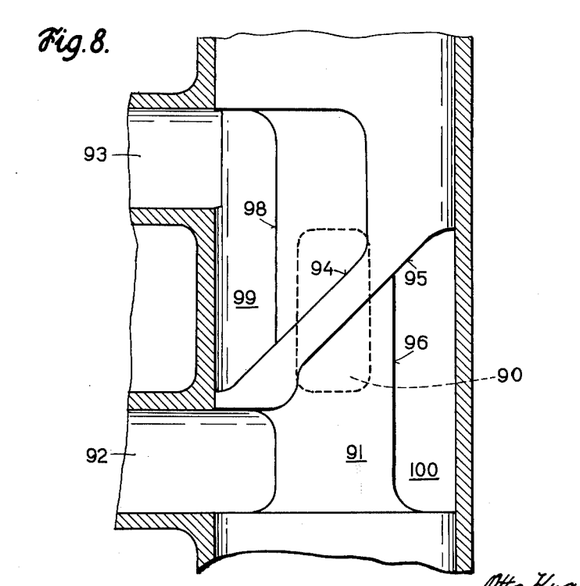
FIG. 8 illustrates the valve of FIG. 7 in axial section.

FIGS. 7 and 8 respectively show a rotary valve system for an engine of the invention in radial and axial section. An aperture 90 in the casing 1 may be connected by a rotary valve member 91 with an intake port 92 and with an exhaust port 93. During rotation of the valve member 91 in the counterclockwise direction indicated by an arrow in FIG. 7, an edge 98 of the valve member controls exhaust port opening time, an edge 94 determines exhaust end, an edge 95 the beginning of intake, and an edge 96 the end of intake. An exhaust chamber 99 and an intake chamber 100 are recessed in a generally cylindrical surface of the valve member 91. The two chambers 99, 100 are separated from each other except for a brief period when exhaust is terminated and intake begins.

The corresponding valve position is illustrated in FIGS. 7 and 8. The arrangement of the rotary valve member 91 is suitable without supplemental cooling for lean mixtures in carburetor equipped engines, where heat transferred to the rotary valve member 91 from the burnt gases is dissipated in the fresh fuel mixture. When it is preferred to avoid dissipation of the heat from the burnt gases in the fresh fuel mixture, it is advisable to provide for cooling of the valve. FIG. 7 shows a cavity 97 in the member 91 arranged to receive a cooling fluid, preferably from the valve drive.

Obviously many modifications and variations of the present invention are possible in the light of the above teachings. More specifically, the number of vanes and the corresponding number of combustion chambers between circumferentially adjacent vanes may be selected at will in conjunction with suitable motion transmission means interposed between the vane-carrying piston and the eccentric which cause the eccentric to rotate relative to the casing at a speed equal to the piston speed multiplied by the number of vanes or chambers, and in the opposite direction to the direction of piston rotation relative to the casing. The number of valve systems can be selected to suit the specific combustion cycle. As will be evident from consideration in FIG. 4, an engine having five vanes can be arranged for two six-stroke cycles to take place in each combustion chamber during each revolution of the piston relative to the casing.

The engines of the invention may provide ignition of a fuel mixture by means of sark plugs, by hot spots, or simply by injection of fuel into a hot, compressed, combustion-supporting gas. One of the strokes of the aforementioned six-stroke cycle may be employed for compression of fluid not followed by ignition, or for displacement of fluid to another chamber for extended expansion.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

We claim:

1. An internal combustion engine comprising, in combination:
   (a) a casing having an axis and an inner wall of circular cross section about said axis, said wall defining a cavity in said casing;
   (b) an eccentric member rotatable about said axis and having a face of circular cross section in a plane transverse of said axis, said face being eccentric with respect to said axis and to said wall;
   (c) a piston member rotatably mounted on said face, said piston member and said wall defining therebetween an annular space in said cavity;
   (d) a plurality of vane means secured to said piston member for rotation therewith, said vane means sealingly engaging said wall and said piston member and being spaced from each other about said axis, whereby said annular space is divided by said vane means into a plurality of circumferentially offset chambers;
   (e) motion transmitting means interposed between said eccentric member and said piston member for rotating one of said members relative to said casing in one direction at a first speed when the other member rotates relative to said casing in the other direction at a second speed different from said first speed, one of said speeds being an integral multiple of the other speed, whereby the volume of each of said chambers changes cyclically, during each revolution of one of said members, between a plurality of maximum volumes and a plurality of minimum volumes, each chamber when at said plurality of minimum volumes thereof being defined by respective circumferential portions of said inner wall;
   (f) ignition means on one of said wall portions;
   (g) valve means on another one of said wall portions; and
   (h) valve control means operatively connected to said piston member and to said eccentric member for operating said valve means in timed sequence with the rotation of said members.

2. An engine as set forth in claim 1, further comprising a shaft coaxial with said cavity in said casing and arranged for rotation about the common axis, said eccentric member being fixedly mounted on said shaft.

3. An engine as set forth in claim 2, wherein said vane means are rotatably mounted on said shaft, the engine further comprising sealing means securing said vane means to said piston member for relative angular displacement and for relative movement radial with respect to said common axis.

4. An engine as set forth in claim 1, wherein the combined number of said ignition means and of said valve means is equal to the number of said vane means plus one.

5. An engine as set forth in claim 4, wherein said motion transmitting means include an internal ring gear fixedly fastened on said casing, and a gear wheel fixedly fastened to said piston member and meshingly engaging said ring gear, the ratio of the number of teeth on said ring gear to the number of teeth on said gear wheel being equal to the ratio of said combined number to said number of vane means.

6. An engine as set forth in claim 1, further comprising an exhaust port and an intake port, said valve means being operable in a cycle in which said valve means alternatingly connects said annular space once to each of said ports, and said valve control means including means operatively connecting said valve means to said piston member for operating said valve means in one cycle thereof during each revolution of said piston member.

7. An engine as set for in claim 1, further comprising an exhaust port and an intake port, said valve means including a valve member mounted on said casing for rotation about an axis between three positions, said valve member being formed with two recesses therein, and said inner wall having an aperture, one of said recesses in one of said positions of said valve member simultaneously communicating with one of said ports and with said aperture, the other recess in a second position of said valve member simultaneously communicating with the other port and said aperture, and said valve member in the third position thereof blocking said aperture.

8. An internal combustion engine comprising, in combination:
   (a) a casing having an axis and an inner wall of circular cross section about said axis, said wall defining a cavity in said casing;
   (b) an eccentric member rotatable about said axis having a face of circular cross section in a plane transverse of said axis, said face being eccentric with respect to said axis and to said wall;
   (c) a piston member rotatably mounted on said face, said piston member and said wall defining therebetween an annular space in said cavity;
   (d) at least three vane means secured to said piston member for rotation therewith, said vane means sealingly engaging said wall and said piston member and being spaced from each other about said axis, whereby said annular space is divided by said vane means into at least three circumferentially offset chambers;
   (e) motion transmitting means interposed between said eccentric member and said piston member for rotating said eccentric member relative to said casing in one direction at a predetermined rotary speed when said piston member rotates relative to said casing in the other direction at a speed lower than said predetermined speed, the ratio of the rotary speeds of said members being equal to the number of said vane means, whereby the volume of each of said chambers changes cyclically during each revolution of said member between a maximum volume and a minimum volume, each chamber when at a minimum volume thereof being defined by a circumferential portion of said inner wall, the number of said wall portions being equal to the number of said vane means plus one;

(f) ignition means on two of said wall portions;

(g) valve means on two other wall portions, said valve means being circumferentially interposed between said ignition means; and (h) valve control means operatively connected to said piston member and to said eccentric member for operating said valve means in timed sequence with the rotation of said members.

9. An engine as set forth in claim 8, wherein the angular spacing of said ignition means on said two wall portions relative to said axis is substantially equal to 720 degrees divided by a number equal to the number of said vane means plus one.

10. An engine as set forth in claim 8, wherein the angular spacing of said valve means on said two wall portions relative to said axis is substantially equal to 720 degrees divided by a number equal to the number of said vane means plus one.

11. An engine as set forth in claim 8, wherein the number of said vane means is at least four, and the number of said wall portions is at least five, said engine further comprising additional valve means on a third other wall portion, said additional valve means being angularly spaced from one of the valve means on said two other wall portions by an angle equal to 360 degrees divided by a number equal to the number of said vane means plus one, and the spacing of said ignition means on said wall means is equal to 1080 degrees divided by a number equal to said number of vane means plus one.

References Cited by the Examiner

UNITED STATES PATENTS

| | | | |
|---|---|---|---|
| 1,004,696 | 10/11 | Schoeck | 123—16 |
| 1,081,678 | 12/13 | McLane. | |
| 1,142,576 | 6/15 | Inshaw | 123—8 |
| 1,154,645 | 9/15 | McGonigle | 123—8 |
| 1,350,231 | 8/20 | McFarland | 123—16 |
| 1,536,851 | 5/25 | Hewitt | 123—16 |
| 2,071,799 | 2/37 | Mabille | 123—16 |
| 2,132,153 | 10/38 | Garretson | 123—16 |
| 2,203,449 | 6/40 | Tips | 123—16 |
| 2,403,684 | 7/46 | Rich | 123—16 |
| 2,674,987 | 4/54 | Camfield | 123—190 |
| 2,969,049 | 1/61 | Dillenberg | 123—16 |
| 2,989,955 | 6/61 | Dunne | 123—190 |

SAMUEL LEVINE, *Primary Examiner.*

FRED E. ENGLETHALER, JOSEPH H. BRANSON, JR.,
*Examiners.*